(12) United States Patent
Povolny et al.

(10) Patent No.: US 9,380,117 B2
(45) Date of Patent: Jun. 28, 2016

(54) DEVICE AND METHOD FOR RADIO PROGRAMMING WIRELESS TERMINAL DEVICES

(75) Inventors: Robert Povolny, Vienna (AT); Jasja Tijink, Breitenfurt (AT)

(73) Assignee: KAPSCH TRAFFICCOM AG, Vienna (AT)

( * ) Notice: Subject to any disclaimer, the term of this patent is extended or adjusted under 35 U.S.C. 154(b) by 962 days.

(21) Appl. No.: 13/091,530

(22) Filed: Apr. 21, 2011

(65) Prior Publication Data

US 2011/0260836 A1 Oct. 27, 2011

(30) Foreign Application Priority Data

Apr. 26, 2010 (EP) .................................. 10450067

(51) Int. Cl.
| | |
|---|---|
| *G05B 19/00* | (2006.01) |
| *H04Q 9/00* | (2006.01) |
| *B60R 25/00* | (2013.01) |
| *H04Q 5/22* | (2006.01) |
| *H04M 3/00* | (2006.01) |
| *H04B 7/00* | (2006.01) |
| *H04R 21/02* | (2006.01) |

(Continued)

(52) U.S. Cl.
CPC ............. *H04L 67/125* (2013.01); *H04L 67/34* (2013.01); *H04W 8/245* (2013.01); *H04L 67/12* (2013.01); *H04L 69/40* (2013.01)

(58) Field of Classification Search
CPC ........... G07C 9/00817; G07C 9/00182; G07C 9/00309; B60R 25/04; G06K 7/0008; H04M 1/72533; H04W 84/18; H04R 1/083; G01V 1/3808

USPC ............. 340/5.23, 5.22, 5.1, 5.71, 10.1, 10.8; 455/420, 41.2; 381/355; 367/21
See application file for complete search history.

(56) References Cited

U.S. PATENT DOCUMENTS

| | | | | |
|---|---|---|---|---|
| 2003/0109223 | A1* | 6/2003 | Toyama | ........................ 455/39 |
| 2004/0029557 | A1* | 2/2004 | Pugliese | ............ G08B 21/0208 455/404.2 |

(Continued)

FOREIGN PATENT DOCUMENTS

| | | |
|---|---|---|
| EP | 1 398 987 A1 | 3/2004 |
| WO | WO 2007/045937 A1 | 4/2007 |
| WO | WO 2008/056275 A1 | 5/2008 |

OTHER PUBLICATIONS

Extended European Search Report for corresponding European Patent Application No. 10 450 067.3, dated Nov. 5, 2010, 8pp.

*Primary Examiner* — Munear Akki
(74) *Attorney, Agent, or Firm* — Lewis Roca Rothgerber Christie LLP

(57) ABSTRACT

A method and device for radio programming wireless terminal devices, which have a unique radio identification and an optical or acoustic signal device, with a transceiver for radio communication with the terminal devices and a control device connected to the transceiver. The control device is configured for radio programming the terminal devices with a predetermined radio identification via the radio transceiver. The control device is connected with at least one optical or acoustic signal detector and is configured for transmitting a request for emission of an optical or acoustic signal to a terminal device with a predetermined radio identification via the transceiver. The terminal device is radio programmed, only when the signal detector detects an optical or acoustic signal.

17 Claims, 1 Drawing Sheet

(51) Int. Cl.
   *H04L 29/08* (2006.01)
   *H04W 8/24* (2009.01)
   *H04L 29/14* (2006.01)

(56) References Cited

U.S. PATENT DOCUMENTS

| | | | | |
|---|---|---|---|---|
| 2006/0214766 A1* | 9/2006 | Ghabra | ............... | G07C 9/00309 340/5.25 |
| 2006/0264730 A1* | 11/2006 | Stivoric | ................ | A61B 5/0205 600/390 |
| 2008/0113618 A1* | 5/2008 | De Leon | ................ | H04W 12/04 455/41.2 |
| 2008/0140868 A1* | 6/2008 | Kalayjian | ............. | G06F 1/1698 710/8 |
| 2009/0286479 A1 | 11/2009 | Thoresson et al. | | |
| 2011/0050428 A1* | 3/2011 | Istoc | ..................... | G06F 19/345 340/573.1 |
| 2011/0250928 A1* | 10/2011 | Schlub | .................. | H01Q 1/243 455/550.1 |
| 2012/0290251 A1* | 11/2012 | Groeneweg | ........... | B61L 23/042 702/130 |
| 2012/0293308 A1* | 11/2012 | Steeves | ............... | G06K 7/10108 340/10.3 |

* cited by examiner

DEVICE AND METHOD FOR RADIO PROGRAMMING WIRELESS TERMINAL DEVICES

CROSS-REFERENCE TO RELATED APPLICATION(S)

This application claims priority to European Patent Application No. 10 450 067.3, filed on Apr. 26, 2010, the contents of which are hereby expressly incorporated by reference.

FIELD OF THE INVENTION

The present invention relates to a device and a method for radio programming wireless terminal devices, which have a unique radio identification and an optical or acoustic signal device. In particular, the invention relates to a device and a method for radio programming terminal devices in the form of onboard units or OBUs, which are carried by vehicles in association with a wireless road toll system.

BACKGROUND

Publications WO 2008/056275 A1 and WO 2007/045937 A1 disclose that when pairing mobile devices using the Bluetooth standard request an addressed terminal device to emit an optical signal pattern, they conduct the pairing with the identified terminal device only when this signal pattern is detected by the initiating mobile device.

Wireless terminal devices or OBUs are often produced without being assigned to a specific user or area of use and are only initialised with the specific data upon issue and transferred to the user. In this case, the initialisation generally occurs directly in the location where the terminal device is issued or sold, the so-called point of sale (POS), by means of a special programming station, which inputs the initialisation or personalisation data into the terminal device via the radio interface (radio programming).

Even if the radio interface between the programming station and the terminal device has a constantly restricted range, for example, if WLAN (wireless local area network), WAVE (wireless access in a vehicle environment) or DSRC (dedicated short-range communication) interfaces are used, or even occurs in a screened interior of the programming station, it still may be the case that a stack of "fresh" terminal devices lies too closely to the programming station at the POS and that besides the terminal device to be programmed. Further terminal devices are thus unintentionally programmed along with it, with the risk that the user is provided with a device that has not been programmed or an incorrectly programmed terminal device comes into circulation.

SUMMARY

The present invention provides a device and a method for radio programming wireless terminal devices. The invention employs the optical or acoustic signal device present in most wireless terminal devices, for example, a status LED or a beeper, to validate the terminal device that is radio programmed. Unintentional programming of other terminal devices located in the radio range of the programming station can thus be reliably prevented.

In some embodiments of the invention is a device for radio programming wireless terminal devices each having a unique radio identification and a signal device of an optical or acoustic type. The device includes a transceiver for radio communication with the terminal devices; and a control device electrically coupled to the transceiver and to at least one optical or acoustic signal detector. The control device is configured to acquire information, via the transceiver, from a terminal device with a predetermined radio identification concerning the type of signal that terminal device can emit, to transmit a request to said terminal device dependent on said acquired information for emission of a corresponding optical or acoustic signal, and to radio program said terminal device when the signal detector detects said corresponding optical or acoustic signal.

In some embodiments of the invention includes at least one optical signal detector, and the terminal device is located in a receiving arrangement for a terminal device protected from ambient light. In some embodiments with at least one acoustic signal detector, the terminal device is located in a receiving arrangement for a terminal device protected from ambient noise. The security of assignment between the programming station and the terminal device to be programmed can be increased still further as a result of this. Interference as a result of other terminal devices located in viewing or sound range can thus be reliably prevented.

In some embodiments, receiving arrangement is an internal space of the device, towards which both the transceiver and the signal detector are directed. Thus, the internal space of the device that serves for screened radio programming in a manner known per se can also be used.

In some embodiments, the signal detector detects the signal form and/or frequency of the optical or acoustic signal, as a result of which the signals of the terminal device can be better distinguished from interfering ambient noise or ambient light.

In the simplest case, depending on what type of signal means the terminal devices are equipped with, only one optical or only one acoustic signal detector can be provided and only one optical or acoustic response signal is sufficient for the control device as prerequisite for the radio programming. In the case of terminal devices that have both types of signal devices, in order to increase security against interference, both an optical and an acoustic signal detector can be provided. The control device is then configured to transmit a request for emission of an optical and an acoustic signal to a terminal device with a predetermined radio identification via the transceiver. The terminal device is a radio programmed only when the signal detectors detect an optical and an acoustic signal.

The radio identification is preferably a unique device identification or MAC address of the terminal device, in particular if this is part of a WLAN or WAVE network.

In some embodiments, the terminal device to be radio programmed is inserted into a receiving arrangement of the radio programming station protected against ambient light. Alternatively, the terminal device to be radio programmed is inserted into a receiving arrangement of the radio programming station protected against ambient noise. The internal space of the programming station in which the radio programming also occurs may be used as receiving arrangement.

In some embodiments, the present invention is a method for radio programming wireless terminal devices each having a unique radio identification and each capable of emitting an optical or acoustic signal, by a radio programming station. The method includes: acquiring information by the radio programming station from a terminal device with a predetermined radio identification concerning a type of signal that terminal device can emit; transmitting by the radio programming station a request to said terminal device dependent on said acquired information for emission of a corresponding optical or acoustic signal; and radio programming said terminal device when the radio programming station detects said corresponding optical or acoustic signal.

In some embodiments, the signal form and/or frequency of the optical or acoustic signal is evaluated and the terminal device is radio programmed only when the evaluated signal form and/or frequency correspond to predetermined criteria. As a result, the signals of the terminal device can be better distinguished from the interfering ambient noise or ambient light.

In some embodiments, the radio programming station transmits a request for emission of both an optical and an acoustic signal, and the radio programming station radio programs the terminal device, only when it receives both of the optical and the acoustic signals.

According to a further embodiment of the invention, the radio programming station radio scans the radio identifications of all terminal devices reachable by it, and acquires the information and transmits the request, for each one of the scanned reachable terminal devices.

In some embodiments, the process is discontinued as soon as the first terminal device is radio programmed, because as a general rule only one of the terminal devices should be programmed and is also brought into optical or acoustic proximity of the signal detector of the programming station for this. It is therefore unnecessary to check further terminal devices for an optical or acoustic response after locating the first responding terminal device.

However, if no terminal device responding appropriately in an optical or acoustic manner is detected at all, said acquiring information and said transmitting the request can be repeated with other radio parameters, for example, other radio frequencies or protocols.

BRIEF DESCRIPTION OF THE DRAWINGS

The invention is explained in more detail below on the basis of exemplary embodiments represented in the attached drawings, wherein.

DETAILED DESCRIPTION

Figure 1:
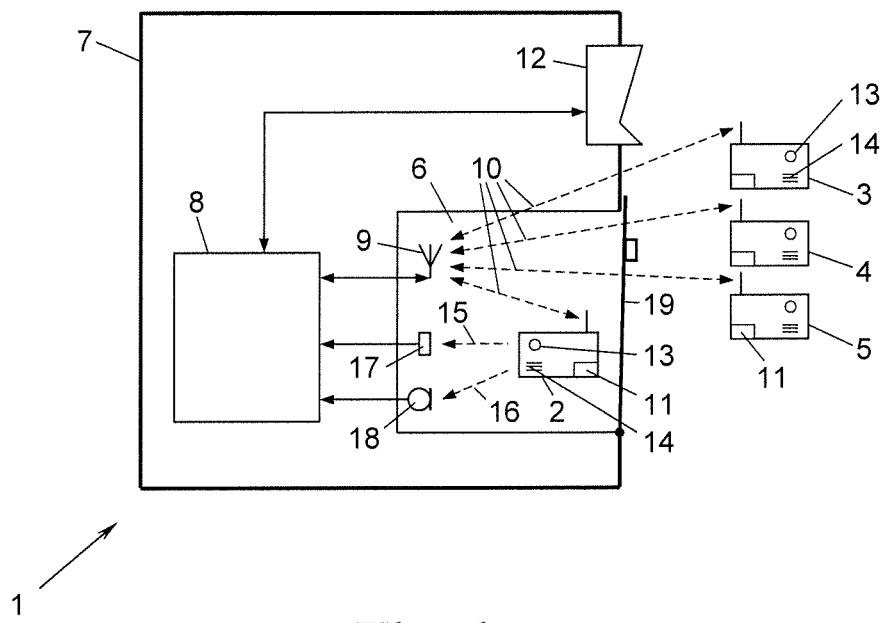
FIG. 1 is a block diagram of a device, according to some embodiments of the invention.

FIG. 1 shows a device or programming station 1 for radio programming wireless terminal devices 2-5, in particular OBUs of a road toll system, according to some embodiments of the invention. A respective terminal device to be programmed, here terminal device 2, is received in a receiving arrangement, in an internal space 6 of a housing 7 of the device 1, for the duration of the programming procedure. The other terminal devices 3-5 are stored for example, as a stack of "fresh" terminal devices in the vicinity of the device 1.

The programming station 1 includes a control device 8 with a transceiver 9 connected thereto for radio communication with the terminal devices 2-5 via a radio interface 10. Potentially any terminal device 2-5 can be addressed and radio programmed via the radio interface 10. During this radio programming user- or application-specific data, for example, can be input into the terminal device 2-5, for example, a user identification, account number, vehicle identification etc.

For individual addressing, each terminal device 2-5 is provided with a unique radio identification 11, for example, a unique device identification (OBU-ID), a MAC address if the radio interface is a WLAN or WAVE interface, for example, or similar.

The radio identifications 11 of the terminal devices 2-5 located in radio range of the transceiver 9 are not initially known to the programming station 1, or more precisely to its control device 8. The radio identification 11 of the terminal device 2 to be programmed must therefore either be predetermined via an (optional) input device 12, or the radio identifications 11 of all reachable terminal devices 2-5 are firstly scanned via the radio interface 10. In the case of self-input, it is not assured that the input radio identification 11 actually identifies the input device 2 located in the receiving arrangement 6. In the case of broadcast scanning, there is no assignment present at all between the scanned radio identifications 11 and the terminal device now actually to be programmed. Therefore, to assure in any case a unique identification of the terminal device 2 to be radio programmed where the programming station 1 is concerned, the following device and the following method are provided.

The device and method utilise the fact that wireless terminal devices 2-5 are generally equipped with an optical and/or acoustic signal device 13, 14, for example, a light-emitting diode (LED) or illuminated LCD display 13 and/or a loudspeaker or beeper 14, which can be caused to emit an optical or acoustic signal 15, 16 via the radio interface 10.

The programming station 1 is equipped with a corresponding optical signal detector 17, for example, a photoelectric cell, and/or an acoustic signal detector 18, for example, a microphone. The signal detector or detectors 17, 18 is/are connected to the control device 8. In this case, each signal detector 17 and 18 can also be configured from several single cooperating detection components, for example, several distributed photoelectric cells, several distributed microphones etc.

The control device 8 is programmed so that—before it conducts a radio programming operation on a terminal device 2-5—it addresses the respective terminal device to be programmed (here terminal device 2) and requests emission of an optical and/or acoustic signal 15, 16. The control device 8 then waits for the detection of such an optical and/or acoustic signal by the signal detector or detectors 17 and 18, and the control device 8 performs the radio programming of the respective terminal device 2 via the transceiver 9 and the radio interface 10 only when such an optical and/or acoustic signal 15, 16 is detected.

The control device 8 can also acquire information concerning the type—for example, optical, acoustic, optical and acoustic, form (e.g. pulse form) and/or frequency, etc. of the signals 15, 16 that can be emitted by a terminal device 2 from this beforehand and then configure the request accordingly in dependence on the information received, that is, request emission of the signal 15, 16 that the terminal device 2 is able to emit, and also adjust the signal detectors 17 and 18 accordingly to the signal to be expected.

In the simplest case, depending on what type of signal device 13, 14 the terminal devices 2-5 are equipped with, only the optical signal detector 17 or the acoustic signal detector 18 is provided and only one optical response signal 15 or only one acoustic response signal 16 is sufficient for the control device 8 as prerequisite for the radio programming. In the case of terminal devices 2-5 having both types of signal devices 13 and 14, in order to increase protection against interference, both the optical signal detector 17 and the acoustic signal detector 18 can be provided. The control device 8 only conducts the radio programming, when both the optical response signal 15 and the acoustic response signal 16 are received.

The signal detectors 17 and 18 are preferably positioned in relation to the terminal device 2 to be programmed in such a way that they receive as little ambient light or ambient noise as possible, i.e. where possible only receive the optical or acoustic signal of the terminal device 2 located in the vicinity of or in or at the programming station 1. If an internal space 6 of the housing 7 is used as receiving arrangement for the terminal device 2, the signal detectors 17, 18 are arranged directly in the internal space 6 together with the transceiver 9 for the radio programming.

The internal space 6 can be screened not only against light and noise but also against radio waves, for example, by a closable flap 19 of the housing 7, so that the radio waves of the transceiver 9 penetrate as little as possible to the outside in order to reach as few terminal devices 3-5 located in the vicinity as possible.

If several terminal devices 2-5 are detected in the said broadcast scanning of such terminal devices located in radio range, the control device 8 goes through all the detected radio identifications 11 individually and requests each terminal device 2-5 in succession to emit an acoustic and/or optical signal. As soon as the first optical and/or acoustic signal 15, 16 is detected by the signal detectors 17 and 18, the terminal device 2 to be programmed is found and the radio programming thereof is conducted. The remaining terminal devices 3-5 detected no longer need to be checked further.

Figure 2:
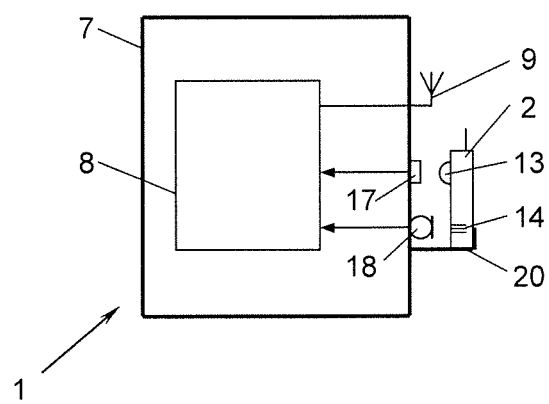
FIG. 2 is a block diagram of a device according to some embodiments of the invention.

FIG. 2 shows some embodiments of the programming station 1, in which the receiving arrangement for the terminal device 2 is a mounting 20 mounted on the outer surface of the housing 7, into which the terminal device 2 can be inserted in such a manner that its signal device(s) 13 and 14 point towards the corresponding signal detector(s) 17 and 18. The signal detectors 17 and 18 are thus protected against ambient light or ambient noise simply by the terminal device 2 located directly in front.

In some embodiments, the programming station 1 of FIGS. 1 and 2 conducts the following procedure:

A request for emission of an optical or acoustic signal 15, 16 is transmitted by the programming station 1 to a terminal device 2 with a predetermined identification 11 to be programmed, and then the terminal device 2 is then radio programmed via the transceiver 9 and the radio interface 10, only when the signal detector or detectors 17, 18 of the programming station 1 receive such an optical and/or acoustic signal 15, 16.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A device for radio programming wireless terminal devices each having a unique radio identification and an optical signal device or an acoustic signal device, comprising:
    a transceiver for radio communication with the terminal devices;
    an optical signal detector and an acoustic signal detector; and
    a control device coupled to the transceiver and to the optical and acoustic signal detectors;
    wherein said control device
    acquires information from a terminal device and determines whether said terminal device includes an optical signal device for transmitting an optical signal or an acoustic signal device for transmitting an acoustic signal;
    transmits a request to said terminal device for emission of a corresponding optical or acoustic signal that said terminal device is capable of transmitting based on whether said terminal device includes an optical signal device or an acoustic signal device;
    receives the corresponding optical or acoustic signal from said terminal device and detects whether the received signal is an optical signal or an acoustic signal; and
    radio programs said terminal device when the optical or acoustic signal detector detects said received optical or acoustic signal.

2. The device according to claim 1, wherein said optical and acoustic signal detectors are located in a receiving arrangement for a terminal device protected against ambient light.

3. The device according to claim 1, wherein said optical and acoustic signal detectors are located in a receiving arrangement for a terminal device protected against ambient noise.

4. The device according to claim 2, wherein the receiving arrangement is an internal space of the device, towards which both the transceiver and the optical signal detector are directed.

5. The device according to claim 3, wherein the receiving arrangement is an internal space of the device, towards which both the transceiver and the acoustic signal detector are directed.

6. The device according to claim 1, wherein the optical or the acoustic signal detector detects the signal form or frequency of the optical or acoustic signal.

7. The device according to claim 1, wherein the control device is configured to transmit a request for emission of an optical signal and an acoustic signal to a terminal device with a predetermined radio identification via the transceiver and then radio program said terminal device only when the signal detectors detect an optical signal and an acoustic signal.

8. The device according to claim 1, wherein said radio identification is a unique device identification, or a MAC address of the terminal device.

9. A method for radio programming wireless terminal devices each having a unique radio identification and capable of emitting an optical or acoustic signal via an optical signal device or an acoustic signal device, by a radio programming station, the method comprising:
    acquiring information from a terminal device and determining whether said terminal device with a predetermined radio identification includes an optical signal device for transmitting an optical signal or an acoustic signal device for transmitting an acoustic signal;
    transmitting by the radio programming station a request for emission of a corresponding optical or acoustic signal that said terminal device is capable of transmitting based on whether said terminal device includes an optical signal device or an acoustic signal device; and
    radio programming said terminal device when the radio programming station detects said received optical or acoustic signal.

10. The method according to claim 9, further comprising inserting the terminal device to be radio programmed into a receiving arrangement of the radio programming station protected against ambient light.

11. The method according to claim 9, further comprising inserting the terminal device to be radio programmed into a receiving arrangement of the radio programming station protected against ambient noise.

12. The method according to claim 10, wherein an internal space of the radio programming station is used as said receiving arrangement, in which the radio programming takes place.

13. The method according to claim 11, wherein an internal space of the radio programming station is used as said receiving arrangement, in which the radio programming takes place.

14. The method according to claim 9, further comprising evaluating one or more of a signal form and a frequency of the optical or acoustic signal, and radio programming the terminal device only when said evaluated one or more of a signal form and a frequency correspond to predetermined criteria.

15. The method according to claim 9, further comprising transmitting by the radio programming station a request for emission of an optical and an acoustic signal to the terminal device with a predetermined radio identification; and radio programming the terminal device only when the terminal device receives said at least an optical signal and an acoustic signal.

16. The method according to claim 9, wherein the radio programming station radio scans the radio identifications of all reachable terminal devices and performs said acquiring information, said transmitting the request, and said radio programming for each one of the scanned reachable terminal devices.

17. A device for radio programming wireless terminal devices each having a unique radio identification, an optical signal device and an acoustic signal device, comprising:
 a transceiver for radio communication with the terminal devices;
 an optical signal detector and an acoustic signal detector; and
 a control device coupled to the transceiver and to the optical and acoustic signal detectors;
 wherein said control device
 transmits a request for emission of an optical signal and an acoustic signal to a terminal device with a predetermined radio identification via the transceiver;
 receives the corresponding optical and acoustic signals from said terminal device; and
 then radio programs said terminal device only when the optical and acoustic signal detectors detect said received optical and an acoustic signals.

\* \* \* \* \*